United States Patent [19]

Brown

[11] Patent Number: 5,160,629
[45] Date of Patent: Nov. 3, 1992

[54] METHOD FOR REMOVING OIL SPILLS USING A NATURAL, RECYCLABLE ABSORBENT

[76] Inventor: Adria Brown, 2177 Colony Club Ct., West Bloomfield, Mich. 48322

[21] Appl. No.: 712,503

[22] Filed: Jun. 10, 1991

Related U.S. Application Data

[63] Continuation-in-part of Ser. No. 511,645, Apr. 20, 1991, abandoned.

[51] Int. Cl.⁵ .............................................. C02F 1/28
[52] U.S. Cl. .................................... 210/671; 210/691; 210/924
[58] Field of Search ..................... 210/671, 691, 242.4, 210/924

[56] References Cited

U.S. PATENT DOCUMENTS 3,617,564  11/1971  Vander Hooven et al. ....... 210/691
3,788,984  1/1974  Teng et al. .......................... 210/671

*Primary Examiner*—Ivars Cintins
*Attorney, Agent, or Firm*—Weintraub, DuRoss & Brady

[57] ABSTRACT

There is provided a method for removing substantial quantities of an organic substance, such as oil, from earth surface materials, such as bodies of water, using entire dried corn cobs in their natural state.

The corn cobs may, thereafter, be used as an alternate fuel source.

14 Claims, 1 Drawing Sheet

METHOD FOR REMOVING OIL SPILLS USING A NATURAL, RECYCLABLE ABSORBENT

CROSS-REFERENCE TO RELATED APPLICATIONS

This application is a continuation-in-part application of co-pending U.S. patent application Ser. No. 07/511,645, filed Apr. 20, 1991, now abandoned, the disclosure of which is hereby incorporated by reference.

BACKGROUND OF THE INVENTION

1. Field of the Invention

This invention relates to a method for removing an organic substance, such as oil, from materials, such as liquids and loose matter and other earth materials. In particular, the present invention relates to the removal of catastrophic organic substances, such as oil spills from bodies of water and earth materials in an environmentally and ecologically beneficial manner.

2. Prior Art

Heretofore, there have been a variety of devices proposed to clean up oil from solid surfaces and bodies of water, including those substantial oil spills, which create ecological disasters. Some prior art devices are designed primarily for flotation and confinement. Other prior art devices for cleaning up oil spills include scoop with mechanical devices and pumps. Other devices comprise absorbent materials, which are usually granular and held by a woven container. However, these devices have minimal absorptive properties in order that they do not sink.

For example, U.S. Pat. No. 4,659,478 to Stapelfeld, discloses a fluid absorbing means, and in particular, a fluid absorbing device having a natural wicking or capillary action for controlling oil spills and deposits around machinery tool bases. The device is an elongated tubular fabric member, filled with a highly porous absorbent material exhibiting a capillary action. The material comprises the ground pith or ground pith and chaff of corn cobs. The ground corn is said to be used because of its excellent capillary and wicking action.

Likewise, U.S. Pat. No. 3,617,564, to Vander Hooven, describes "a method for removing oil or oily substances from the surface or upper layer of a body of water, comprising spreading an absorbent, consisting essentially of corn cob components, excluding all but trace amounts of the woody ring component" upon the oil. Since this method utilizes the corn cob's "lighter components" or "meal" obtained from the corn cob by crushing, cutting or grinding, it also requires separation of the woody ring from the corn cob meal. Vander Hooven discloses that twelve cubic feet of corn cob product, as defined therewithin, will absorb one barrel of oil. However, Vander Hooven recognizes that some corn cob components absorb water and sink. Thus, based upon the teachings of Vander Hooven, it might be expected that any oily substance adhering to those alleged sinkable components would be pulled down beneath the surface of the water, possibly causing worse pollution, and, thus, endangering any life forms in the water and causing loss of the spilled oil.

U.S. Pat. No. 4,497,712, to Cowling, describes "a pillow" which contains corn cobs, having an absorption capacity in excess of 300% up to 500%, and which have been ground into granules. The pillows are dimensioned for easy handling to absorb hydrocarbon chemical spills. According to Cowling, the ground corn cob has an absorbent capacity in excess of 500% while being light in weight, such as 14 lbs. per cubic foot so that the pillow will float when saturated.

It is to be appreciated that to practice either Vander Hooven or Cowling requires necessarily that a special device be fabricated to hold a granular absorptive material, which otherwise may sink, and that processing is required to form the size of granule desired and to separate the woody ring from the lighter components.

Therefore, what is needed is a method of removing an organic substance, such as oil, from materials, such as bodies of water and loose earth material or matter, such as sand, soil and rocks, without the steps of fabricating a device to carry the absorbent, and without the loss of absorbent due to sinking.

As subsequently detailed, the present invention seeks to provide an effective, efficient and economical method, using naturally occurring material, to remove substantial quantities of organic substances such as an oil caused by oil spills, slicks and the like from bodies of water, as well as earth material such as soil, sand and the like to prevent or at least limit, environmental and ecological impact.

SUMMARY OF THE INVENTION

The present invention provides a method wherein absorbent entire corn cobs, in their natural state, are used to remove oil spills without the need for costly processing into granular form. The present method does not require a carrier or other device, such as a net, pouch, woven mat or the like. However, a carrier may be used if desired. The absorbent corn cobs do not sink, and may be removed in a cost effective manner.

Thus, the present invention comprises the utilization of entire corn cobs, in their natural state, to remove an organic substance comprising hydrocarbons, petroleum, oils and the like from bodies of water, such as lakes, streams, rivers, oceans and reservoirs, and from earth materials such as soil, sand and the like.

The method hereof is an ecologically and environmentally advantageous way to remove oil from soil and water to prevent harm to natural resources, marine life and wildlife; and which utilizes materials which are otherwise essentially waste material. Hence, the present invention is practical and economical. Moreover, corn cobs are easily stored, biodegradable, easily shipped, replenishable and readily available in almost any part of the world. Stock piles of the corn cobs can be stored in strategic areas of the world and used when an emergency arises. Although corn cobs can be transported to a spill by various means, the light weight properties of dried corn cobs makes it feasible to carry them over oceans, rivers or lakes by planes, and at an oil slick, drop them from the air, if necessary, for immediate and efficient absorption. The corn cobs can then be quickly retrieved. Using corn cobs in a quick and efficient manner can reduce the cost to clean up our waters and beaches and prevent permanent damage to our natural resources, wildlife and marine life.

Thus, the present method comprises spreading a quantity of entire corn cobs onto a liquid organic substance; absorbing the organic substance into the corn cob and thereafter, removing the corn cobs. Preferably, the present method is used to remove all from a body of water. Furthermore, the recovered or removed corn cobs having the oil absorbed therein may be consumed as a fuel source or the like.

For a more complete understanding of the present invention, references is made to the following detailed description and accompanying drawing.

DETAILED DESCRIPTION OF THE PREFERRED EMBODIMENT

Figure 1:
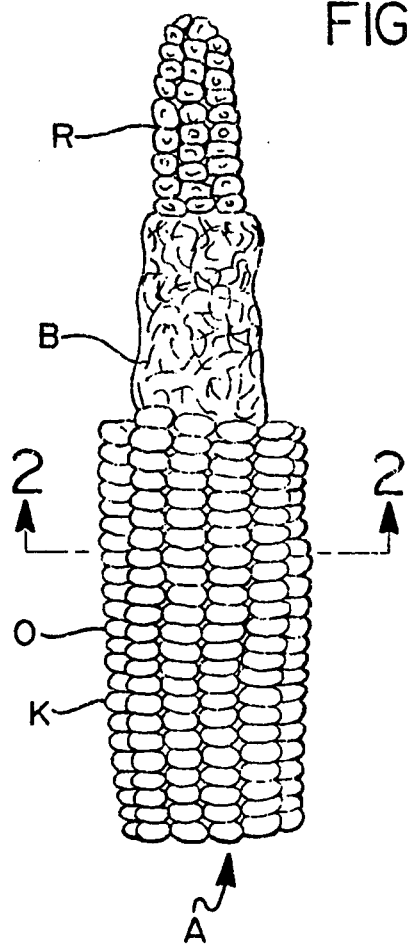
FIG. 1 shows an ear of corn, which has successive layers removed.
Figure 2:
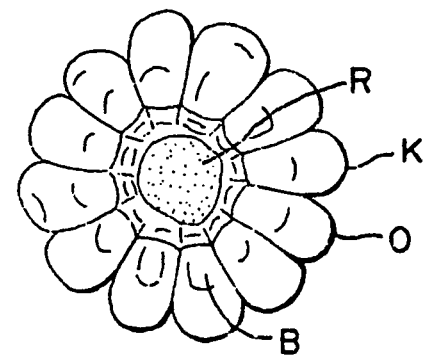
FIG. 2 is a cross section taken from line 2—2 of FIG. 1.
Figure 3:
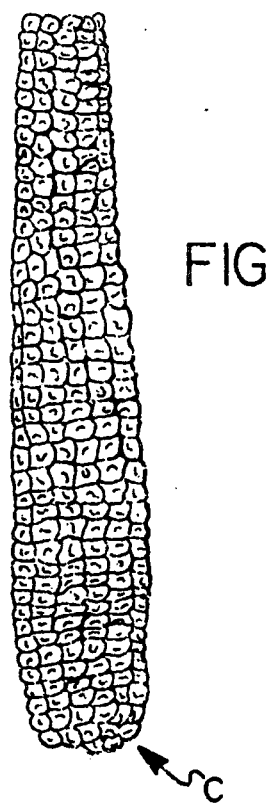
FIG. 3 is a side view of a whole, or entire, corn cob.

Referring to FIGS. 1, 2 and 3, there is depicted structurally an ear of corn A which is comprised of three (3) principal zones; the outer zone O, which is represented by the kernels K; the zone of floral bracts B, which is exposed when the kernels of corn are removed; and the rachis R, which is exposed after the floral bracts B are removed. These terms, and as used in describing the instant invention, are derived from the book entitled *Corn, Its Origin, Evolution and Improvement* by Paul Mangelsdorf, published in 1974.

Moreover, and as disclosed in the above-referred U.S. Pat. No. 3,617,564 at column 1, lines 38-48, the structure of a corn cob is described as being divided into four parts. These parts are (1) the fine chaff or beeswing (inner glumes and thin upper section of the outer glumes), (2) the coarse chaff (lower portion of outer glumes, the kernel caps, and the small stems on which the kernels are borne), (3) the woody ring, and (4) the pith, from USDA Pamphlet AIC-177 (revised) composed by the Northern Regional Research Laboratory, Peoria, Ill., Apr., 1953. The terminology used herein is consistent even though the USDA pamphlet provides additional detail. For example, Webster's 9th New Collegiate Dictionary, 1988 Ed., defines glume as a chaffy bract, rachis as an axial structure, and pith as central spongy tissue of plants. Therefore, the term "rachis", as used herein, includes the woody ring and the pith.

When the kernels K are removed, the remaining structure which comprises the zone of floral bracts B and the rachis R is referred to as the whole corn cob C, (FIG. 3). The present invention utilizes whole corn cobs C, including the woody ring and pith, and which have been at least partially dried, and which are preferably, essentially, completely dry. The high density rachis R is relatively porous. It is somewhat like a cork material and it has been found that, when dry, it is buoyant.

Thus, in accordance with the present invention, it has been found that the entire corn cob, not just selected portions, effectively removes oil from water and other earth material. Although the physical properties, e.g., absorption, surface tension, etc., by which a corn cob effectively collects and retains an organic substance, particularly from water, is not entirely understood, it appears that the floral bracts B, on naturally dried corn cobs collect and retain an organic substance, such as oil, when placed upon liquids, such as water, or loose material, such as sand. Hence the terms such as absorption and absorb have been used herein in a broad sense to describe the result achieved, that is, the retention of the oil by the cob, and not necessarily the technical phenomenon producing the oil retention. The dried corn cob floats on the water and thus it is easily retrievable, even after oil is retained thereon. It is believed that the cork-like rachis R provides the buoyancy.

Although the present invention is particularly suited for removing liquid hydrocarbons, such as oil encountered from oil slicks, oil spills from bodies of water and the like, whole corn cobs can also be dispensed on threatened beaches, and other sandy earth material. In use, upon the occurrence of an oil spill on land or on water, dried corn cobs are brought to the location and spread on the soil, body of water, earth material and the like. In conjunction with earth material, the corn cobs can then be mixed into the earth material. The corn cobs may, therefore, be removed by scooping, raking, sweeping, or sifting. Using corn cobs in this manner enables oils to be collected before it seeps deeply below the ground surface.

Upon the occurrence of an oil spill on water, the dried corn cobs may be picked up from the stock piles and transported, for example by helicopters or the like, to the location of the oil spill and lowered in nets, in large quantities, and dropped over the oil spill area, starting from the outer perimeter so as to confine the spread of the oils. Alternatively, large quantities of corn cobs could be dispersed directly from large, low-flying cargo airplanes, for example, of the type used to drop large military equipment. The waves provide a natural agitating means to enhance contact between the contaminant and the cob. Agitation by mechanical means can also be used.

In practicing the present invention, corn cobs that remain after conventional corn processing, essentially as a waste by-product, may be collected and stock piled in large quantities at selected locations, preferably in close proximity to locations where an accidental oil spill could have a disastrous environmental impact and a tendency to occur.

Once the oil is absorbed, the soaked corn cobs can be scooped up by any suitable means and taken to a designated place for extracting the oil from the corn cobs by mechanical extraction devices, such as a press. After recovery, solvents may also be used to extract the oil. Moreover, after the oil is extracted, the corn cob remnants could be a fuel source. Alternatively, the soaked cobs may also be used as fuel source.

It should be understood that the invention may be practiced using whole, or entire, corn cobs C and/or pieces of entire cobs. It will be readily appreciated by those familiar with the art that when corn is harvested, husked and shelled, the whole corn cob C may break, or the whole, or entire, corn cob C may break when it is dried, stored or otherwise handled. Hence, the by-product of typical corn handling operations provides a mixture of whole entire corn cobs C and pieces of entire corn cobs and either or both may be used herein.

In typical corn processing, the corn can be shelled as a part of the harvesting operation or ears of husked corn are dried or stored prior to shelling. Field dried corn already has its moisture content reduced. It is believed that corn sheller losses decrease as the moisture content of the ear of corn A decreases. Ears of corn with high moisture content may tend to break and kernels of corn K stick to the whole corn cob C and cob pieces. The moisture content for safe storage of ear corn in cribs may be between 16 and 18 percent. Hence, field dried corn may be dried in cribs or crop driers may be used to reduce the moisture content of the ear of corn. In any event, with conventional corn processing, the cobs remaining after the shelling are relatively dry.

In the practice hereof, it is preferred that corn cobs C resulting from conventional corn processing, without additives and processing of the cob are used. However, the scope of the present invention does not necessarily exclude some processing of the corn cobs C or the use of additives.

As noted, the corn cobs, in their natural dried state, are light weight and porous and float easily when placed on the water surface. Even with the absorption of oil in the corn cobs, the corn cobs continue to float.

Although the preferred embodiment of the present invention has been described for controlling large oil spills on water and cleaning up beaches, in its broader aspects, the present invention contemplates the use of corn cobs to separate a substantial quantity of a liquid organic substance comprising hydrocarbons, petroleum, oils and the like from a substantial quantity of a material comprising bodies of water and loose matter comprising sand, gravel, pebbles, rocks, soil and the like so that the organic substance may be absorbed and removed from the material, to thereby prevent or at least reduce ecological and environmental impacts.

It should be noted that in the case of earth material, such as soil or sand on a shore, the corn cobs are brought into contact with the surface or upper layer of the soil or sand. An organic substance, such as oil, may seep through the surface of loose material, such as soils, rocks and sand. Thus, it may be desirable to contact the corn cobs with the material below the surface as well as above the surface of the loose material. Consequently, the term "upper layer" as used herein, includes the surface of earth material and the depth below the surface, if any, to which the organic substance has seeped and is to be removed.

Likewise, organic substances, such as oil, float on water. However, some organic substances and components of oil have a specific gravity about equal to that of water and slightly greater. Therefore, the organic substance may displace a quantity of water and thereby form one or more layers in and on the body of water. Therefore, the term "upper layer" includes the surface of a body of water and the depth below the surface, if any, which the organic substance occupies.

In practicing the present invention, from about 300 cubic feet to about 1000 cubic feet of corn cobs are used to absorb or remove about 1000 gallons of liquid oil product from the contaminated earth surface material, i.e. water or earth material.

For a more complete understanding of the present invention, reference is made to the following, non-limiting, illustrative examples.

EXAMPLE 1

The following example illustrates, in simple terms, the effectiveness of removing an organic substance, such as oil, from water with dried entire corn cobs in accordance herewith.

Into a suitable container was placed 1½ quarts of water. Thereafter, one cup of relatively heavy 20 w 50 automobile oil was added thereto. Five entire corn cobs were then placed in the container on the oil. Then, the container was agitated for about one minute to contact the corn cobs with the oil. The corn cobs were removed with a scoop. The remaining oil was measured and it equaled about 1 teaspoon.

By extrapolating the results of Example I, it can be roughly estimated that it would take somewhere on the order of 80,000 corn cobs, occupying about 600 cubic feet, to remove an oil spill of 1000 gallons. Thus, somewhere on the order of a 9×9 foot room full of corn cobs could be used to remove each 1000 gallons of oil. For spills between 100,000 and 1,000,000 gallons, somewhere on the order of between 60,000 and 600,000 cubic feet of corn cobs might by required. Although these quantities might initially appear to be large, they are believed to be commercially exploitable to protect the ecology while being quite reduced from the quantities for parts of the corn or materially altered forms thereof shown in the prior art.

EXAMPLE II

Following the procedure of Example I, a series of tests were conducted with different grades of oils using both salt water and fresh water. The results show that with the use of dried entire corn cobs in their natural state, oil is quickly absorbed from the surface of the water directly into the zone of bracts B of the corn cob. The oil quickly agglomerates in the zone of the bracts B of the corn cob and is absorbed into the corn cob.

It is also found that oil and water do not saturate the rachis and it is also found that oil and water do not sink even after 24 hours.

Having, thus, described the invention, what is claimed is:

1. A method of removing a liquid oil substance from an earth surface material to thereby at least reduce ecological and environmental impacts, comprising:
   contacting a quantity of corn cobs with the liquid oil substance to absorb the liquid oil substance from said material onto the corn cobs, the corn cobs being the entire corn cobs, including the zone of the floral bract corn cob components integral with the inner rachis of the corn cob components.

2. The method of claim 1 wherein said corn cobs are employed in an amount ranging from about three hundred cubic feet to about one thousand cubic feet thereof per 1000 gallons of oil.

3. The method of claim 1 further comprising drying said corn cobs before said contacting.

4. The method of claim 1 further comprising maintaining contact of said corn cobs with said liquid oil substance so that said liquid oil substance is retained by said corn cobs and then removing said corn cobs from said material.

5. The method of claim 4 further comprising burning said corn cobs having said liquid oil substance retained thereon after said corn cobs are removed from said material.

6. The method of claim 4 further comprising extracting said liquid oil substance from said corn cobs after said corn cobs are removed from said material.

7. The method of claim 6 further comprising burning said corn cobs after extracting said liquid oil substance therefrom.

8. The method of claim 1 further comprising separating said corn cobs from said material.

9. The method of claim 1 wherein said material comprises a body of water having an upper layer, the oil floating thereon and said corn cobs are brought into contact with said upper layer of said body of water.

10. The method of claim 9 wherein said corn cobs are brought into contact with said upper layer by agitating said body of water.

11. The method of claim 1 wherein said material comprises an earth material having an upper layer and said corn cobs are brought into contact with said upper layer of said earth material.

12. The method of claim 11 wherein said corn cob is brought into contact with the earth material by mixing.

13. A method for removing oil or oily substances from the surface of a body of water, comprising:
 (a) spreading a quantity of dry entire corn cobs on said oil, said cobs having outer floral bract corn cob components integral with the inner rachis corn cob components;
 (b) absorbing said oil with said corn cobs; and
 (c) removing said corn cobs from said water with said oil being retained by said corn cobs; and
 wherein the cobs float on the body of water.

14. The method set forth in claim 13 wherein said quantity of corn cobs is a mixture of whole entire corn cobs and broken pieces of entire corn cobs and said mixture is substantially free of corn cob components in granular and particulate form.

* * * * *

UNITED STATES PATENT AND TRADEMARK OFFICE
CERTIFICATE OF CORRECTION

PATENT NO. : 5,160,629

DATED : November 3, 1992

INVENTOR(S) : Adria Brown

It is certified that error appears in the above-identified patent and that said Letters Patent is hereby corrected as shown below:   Title page:

Item: [63] Continuation-in-part of Serial No. 511,645, April 20, [1991[ --1990--, abandoned.

col 1, l. 9, delete "1991" and insert --1990--.

Signed and Sealed this

First Day of February, 1994

Attest:

BRUCE LEHMAN

*Attesting Officer*        Commissioner of Patents and Trademarks